3,020,232
DRILLING MUD CONDITIONER
Joseph Bayne Doughty, Charleston, S.C., assignor to West Virginia Pulp and Paper Company, New York, N.Y., a corporation of Delaware
No Drawing. Filed Apr. 21, 1958, Ser. No. 729,537
4 Claims. (Cl. 252—8.5)

This invention relates to the drilling of oil and gas wells, and pertains more specifically to conditioners for improving drilling fluids and to methods of making the same.

In general a drilling fluid, particularly one used for rotary drilling operations, is also termed "a drilling mud" or simply "a mud." Drilling fluids commonly used are water-base fluids, for example clay suspended in water, and oil-base drilling fluids, for example calcium carbonate suspended in oil. Many different additives or conditioners have been contrived for these two types of fluids to improve their utility.

The primary functions of the "mud" are: (1) to lubricate and cool the drilling tool; (2) to suspend the cuttings from the drilling operations so that they are carried to the surface and removed; (3) to prevent excessive amounts of fluids from flowing from the hole into surrounding formations by depositing on the wall of the hole a thin but substantial, impervious filter cake; (4) to serve as a weighting material exerting sufficient pressure to counterbalance any pressure exerted by water, gas, oil, or other earth fluid; and (5) to prevent caving or other intrusion into the drill hole.

The various functions of a drilling mud are in large part dependent upon the viscosity and gel strength of the mud. The mud must be of sufficiently low viscosity to allow it to be readily pumped, and it should be thixotropic. Thixotropy is the property of colloidal suspension which involves an increase in gel strength as a function of the time of undisturbed standing. This property is valuable in that it prevents, to a great extent, the sedimentation of the cuttings in the hole during periods of suspended circulation of the mud. Immediately after violent agitation, however, the cuttings will settle a short distance, and this fact is utilized for effecting their removal in a settling tank. In drilling operations, many different types of soil are encountered, and impurities of many kinds may find their way into the hole. These variations, together with the fact that many different clays are used, complicate and make quite difficult, the control of the viscosities and gel strengths of the muds. In the art a wide variety of chemicals have been used for the reduction of viscosity of drilling fluids, the most common of which are inorganic phosphates and certain three extracts. Sodium tannate has long been used in this application. These chemicals help control the viscosity of the muds in several ways: (1) they sequester heavy metal ions such as calium, iron, etc. so that they do not form a precipitate; (2) they neutralize certain protective colloids present in the soils and clays which tend to form thick gels; (3) they act as useful protective colloids and surface active materials themselves.

In drilling operations for oil and gas, salt or strong brine solutions are often encountered. Many of the muds when they come into contact with the brines, cause the salts to precipitate from solution, or in some other way reduce the effectiveness of some of the mud additives. Unless steps are taken to avoid these actions, the drilling operation can be very expensive or can even prove a total failure. Chemicals used as conditioners for drilling muds, therefore, must be effective in brine solutions as well as in water alone.

Treatments which merely control the viscosity and gel properties of a mud are insufficient unless attention is also given to the cake-forming and water-loss properties of the mud. Of the various characteristics of a drilling mud, one of the most important is its tendency to lose water to the formation. It has been found that the structural strengths of most formations which are penetrated during drilling are sufficient to prevent the hole walls from caving in, but that many such formations are weakened from being saturated or partially saturated with water. Frequently such saturation or partial saturation causes sloughing of the formation into the hole, with a resultant seizing of the drill pipe or tools so that they cannot be removed. Costly fishing jobs result. It is, therefore, of the greatest importance to prevent loss of water from the drilling mud to the formation drilled. The ideal drilling mud should permit very little, if any, loss of water to the formation and should deposit only a relatively thin mud cake on the walls of the hole.

Sulfonated lignins are being widely used as drilling mud conditioners. These materials have a number of properties which make them attractive in this field. They are water soluble over the entire pH range of drilling operations. They are surface active materials and can, therefore, aid in controlling the viscosity of mud slurries or in emulsifying oil and water mixtures. They are sequestering agents and as such they can remove unwanted metallic ions such as calcium from reaction in the muds. They are soluble in brine solutions containing a high concentration of salt. In addition to their valuable chemical and physical properties, the sulfonated lignin materials are in the same price range as, or are less expensive than, the tannins, phosphates and other materials recommended for the same use. These materials are used alone or in combination with other drilling mud conditioners. When used with quebracho, for example, they are of two-fold value; they increase the water solubility of the quebracho so that it can function better, and at the same time the lignin materials aid in conditioning the muds.

Sulfonated lignins may be obtained from woody materials by a number of processes. They can be recovered from the spent liquors of the pulping of wood by one of the sulfite processes. Lignins recovered from the spent liquors of the pulping of wood by either the soda or the kraft process may be reacted with bisulfites, sulfites, or mixtures of these with sulfurous acid to give sulfonated lignins. Lignins isolated from woody materials by other methods, e.g., acid hydrolysis and solvent extraction may also be sulfonated with sulfites and bisulfites.

In my invention, I have discovered a process for preparing drilling mud additives including sulfonated lignins which have an increased usefulness. The additives prepared by my process are capable of reducing or preventing water-loss from drilling muds, a property not inherent in sulfonated lignins as now used. Drilling mud additives according to my invention are obtained by cooking various mixtures of isolated or extracted lignins and barks in aqueous solutions of sulfites or bisulfites or mixtures of bisulfites with sulfurous acid. From these cooks are obtained mixtures of water soluble materials and insoluble pulp. The pulp is retained along with the soluble material and contributes importantly to the prevention of filter losses. The water soluble material contains sulfonated lignin, tannins, hemi-celluloses, and some minor extractives. The sulfonated lignin makes up the greater portion of the water soluble material. The lignin used in the starting mixture and that of the bark are present in the cook as sulfonated lignins. Full advantage is taken of the soluble components of the lignin-bark mixture and of the mechanical properties of the insoluble components of the bark. The lignin used in all of these examples was Indulin A (a pine wood lignin produced by the Polychemicals Division of the West Virginia Pulp and Paper Company, Charleston, S.C.). The pine and gum barks used were taken from the crusher at the Charleston, S.C., mill of the West Virginia Pulp and Paper Company. The barks were mixtures of either pine or gum barks from the common species of each type used for pulp and paper making in the southeastern part of the United States. The pine species used mostly are, loblolly (*Pinus taeda*), shortleaf (*Pinus echinata*), pond (*Pinus glabra*), slash (*Pinus caribaea*), and long leaf (*Pinus palustris*). The most common gum species used are, sweet (*Liquidambar styraciflua*), water tupelo (*Nyssa aquatica*), and black tupelo (*Nyssa sylvatica*). Some minor quantities of barks from other species of pine or gum might have been present in the samples used. The barks were, in every instance, preliminarily dried in an oven at 105° C. to constant weight, then ground in a Wiley mill fitted with a one-eighth inch screen, and then passed through a micro-pulverizer fitted with a one-sixteenth inch screen. The particle size of the bark is not, however, critical.

EXAMPLE 1

A slurry of 210 g. of pine bark, 630 g. of lignin, 504 g. of sodium sulfite, and 3000 ml. of water was prepared and placed in an autoclave. The autoclave was closed, and the mixture was simultaneously stirred and cooked at 160–170° C. for seven hours. The heat was turned off and the autoclave and its contents were allowed to cool over night to room temperature. The cooked mixture was removed from the autoclave and placed in a porcelain evaporating dish. The dish was placed in an oven at 105° C. and the cooked mixture dehydrated to constant weight. The dry sulfonated lignin product was broken into small particles and ground to a powder in a micro-pulverizer fitted with a one-sixteenth inch screen. Tests of the viscosity, gel strength, and filter loss were made with the dry powdered sulfonated lignin. The resulting drilling mud additive included all the bark, the lignin in sulfonated form and the insoluble solids in a finely divided state. While the range of cooking temperatures given is the preferred one, I am not limited thereto and may use a somewhat wider range from 135° C. to 270° C. When using the lower cooking temperatures, a longer time of cooking will be required, while the higher temperatures will necessitate a shorter cooking time.

EXAMPLE 2

In this example a drilling mud additive comprising sulfonated lignin was prepared in a similar manner to that described in Example 1 except that the ratio of bark and lignin cooked was different and the cooking time longer. In this example the slurry cooked contained 420 g. of lignin and 420 g. of pine-bark, and the cooking time was nine hours.

EXAMPLE 3

In this example a drilling mud additive comprising sulfonated lignin was prepared in a similar manner to that described in Example 1 except that the ratio of bark and lignin cooked was different and the cooking time less. In this example the slurry cooked contained 610 g. pine bark and 210 g. lignin and the cooking time was six hours.

EXAMPLE 4

In this example a drilling mud additive comprising sulfonated lignin was prepared in a manner similar to that described in Example 1 except that the amount of sodium sulfite was different. In this example 252 g. of sodium sulfite were used rather than 504 g.

EXAMPLE 5

In this example a drilling mud additive comprising sulfonated lignin was prepared in a manner similar to that described in Example 1 except that gum bark was used instead of pine bark.

EXAMPLE 6

In this example a drilling mud additive comprising sulfonated lignin was prepared in a manner similar to that described in Example 1 except that 464 g. of ammonium sulfite was used rather than the 504 g. of sodium sulfite.

In general, the proportions of bark to lignin may vary from 5 parts bark to 95 parts lignin, to 75 parts bark to 25 parts lignin. I have discovered that the products of cooks of mixtures of lignin with barks of pine and/or gum in inorganic sulfites will impart low viscosity, low initial gel strength, and low ten minute gel strength (the gel strength which develops when the mud stands undisturbed for 10 minutes), to a synthetic drilling mud when added in small amounts. These tests were made according to the American Petroleum Institute Recommended Procedure No. 29 with the actual testing being made with a Stromer viscosimeter. The synthetic drilling mud was composed in every instance of 100 lb. water, 0.25 lb. sodium chloride, 0.5 lb. calcium carbonate, 11.5 lb. kaolin clay, and 1.9 lb. bentonite. Some data obtained in tests of drilling mud containing the novel additives of this invention are given in Tables 1 and 2. In the samples covered by the tables, additive solids were included in the ratio of 7.19 lb. to 114.15 lb. of drilling mud, excepting, of course, the control mud, to which nothing was added.

*Table 1.—Viscosity and gel strength of synthetic drilling mud mixtures containing 0.063% additive*

| Mud Additive | Viscosity, grams Stromer, 600 r.p.m. | Gel Strength, grams | |
|---|---|---|---|
| | | Initial [1] | 10 Min. |
| None | 88.0 | 30.0 | 33.0 |
| Product of Sodium Sulfite Cook of Lignin and Pine Bark: | | | |
| Example 1 | 62.0 | 5.0 | 4.0 |
| Example 2 | 62.0 | 6.0 | 7.0 |
| Example 3 | 61.0 | 3.0 | 4.0 |
| Example 4 | 63.0 | 4.0 | 6.0 |
| Product of Sodium Sulfite Cook of Lignin Only | 67.0 | 5.0 | 4.0 |
| Product of Sodium Sulfite Cook of Lignin and Gum Bark: Example 5 | 62.0 | 3.0 | 4.0 |
| Product of Ammonium Sulfite Cook of Lignin and Pine Bark: Example 6 | 61.0 | 6.0 | 7.0 |
| Palcotan (a Commercial Sulfonated Redwood Bark Product of the Pacific Lumber Company of San Francisco, California) | 67.0 | 4.0 | 9.0 |

[1] After violent agitation.

In addition to giving low viscosity and/or standing gel strengths to drilling muds, the sulfonated novel additives including lignin-bark materials were shown to give very low filter loss in mixtures with oil and brine. When tested by the filtration test of the American Petroleum Institute the sulfonated lignin-bark materials appeared to be compatible with petroleum-saturated brine mixtures to give very low filter loss. In these tests mixtures of 23 g. of the sulfonated lignin-bark materials, including insolubles, 2.7 g. of sodium hydroxide, 76 ml. of fuel oil, and 380 ml. of saturated aqueous sodium chloride solution were placed in a stainless steel blending vessel. The mixture was stirred rapidly for thirty minutes. The well stirred mixtures were then placed in the American Petroleum Institute standard filtration equipment which was fitted with a Whatman No. 50 filter paper. This equipment consists of a metal cylinder of about 600 ml. capacity. The bottom end of the cylinder is fabricated so as to hold a filter paper on a screen and a drain pipe of about one-fourth inch diameter. The other end is made so as to seal the cylinder and contains an outlet to which gas under pressure can be added to the cylinder. To the mixture in the cylinder was added nitrogen gas to a pressure of 100±5 p.s.i. Any liquid evolved from the bottom of the cylinder was caught in a 100 ml. graduated cylinder. The amount of liquid evolved from the cylinder within thirty minutes was considered the filter loss. The values for filter loss from petroleum-brine mixtures containing the sulfonated lignin-bark materials are given in Table 2. Values of 30 ml. or less are considered acceptable.

The principal advantage of the drilling mud additives including sulfonated lignin made from mixtures of lignin and bark according to the invention, over sulfonated lignin now used in drilling mud, lies in the ability of the former products to prevent filter loss. All of the reasons for the low filter loss of oil-brine mixtures containing the lignin sulfonates from the cooks of lignin and bark with sulfites or bisulfites are not known. Much of this, however, is due to the presence of pulp particles which fill the pores and prevent the flow of liquids.

*Table 2.—Filter loss of petroleum-brine mixtures containing sulfonated lignin-bark materials*

| Sulfonated Lignin-Bark Material | Filter Loss by Brine-Petroleum Mixtures, ml. |
|---|---|
| None | total mixture passed through. |
| Product of Sodium Sulfite Cook of Lignin Only | 150. |
| Commercial Sulfonated Lignin | 182. |
| Product of Sodium Sulfite Cook of Lignin and Pine Bark: | |
| Example 1 | 5.8. |
| Example 2 | 7.4. |
| Example 3 | 2.2. |
| Example 4 | 4.9. |
| Product of Sodium Sulfite Cook of Lignin and Gum Bark: Example 5 | 9.0. |
| Product of Ammonium Sulfite Cook of Lignin and Pine Bark: Example 6 | 11.5. |
| Commercial Filter Loss Additive Palcotan (a Commercial Sulfonated Redwood Bark Product of the Pacific Lumber Co. of San Francisco, California.) | 5.0. |

While certain preferred embodiments of the invention have been illustrated and described in detail, it is to be understood that changes may be made therein and the invention practiced in other forms. It is not, therefore, the intention to limit the patent to the specific details illustratively described, but to cover the invention broadly in whatever form its principles may be utilized.

I claim as my invention:
1. The process of preparing a drilling mud additive including sulfonated lignin, which process comprises preparing a mixture of an isolated lignin with ground bark, chosen from the group consisting of pine and gum, in which the bark constitutes 5 to 75% of the mixture, cooking the mixture at a temperature of 135° to 270° C. in an aqueous solution of a lignin sulfonating chemical chosen from the group consisting of an alkali metal sulfite, an alkali metal bisulfite, and a mixture of alkali metal bisulfite with sulfurous acid, and containing from ½ to 8 mols of the chemical to each 840 grams of lignin-bark mixture, until substantially all of the soluble materials are dissolved, and reserving as drilling mud additive the cooked mixture, including at least the soluble and insoluble solids of the cook.

2. A drilling mud additive composition prepared by the process of claim 1, for controlling the viscosity, gel properties, and filter loss of the mud.

3. An aqueous drilling mud made up of a major portion of water and insoluble clayey materials, and characterized by the presence of a minor portion of a drilling mud additive prepared in accordance with claim 1 sufficient to reduce the viscosity, gel strength, and water loss of said aqueous drilling mud.

4. An aqueous drilling mud made up of a major portion of water and insoluble clayey materials, and characterized by the presence of between 0.5 and 20.0 pounds of a drilling mud additive prepared in accordance with claim 1 per 42 gallon barrel of said mud.

References Cited in the file of this patent

UNITED STATES PATENTS

| | | |
|---|---|---|
| 2,491,436 | Barnes | Dec. 13, 1949 |
| 2,674,575 | Lewis et al. | Apr. 6, 1954 |
| 2,674,594 | Lewis et al. | Apr. 6, 1954 |
| 2,680,113 | Adler et al. | June 1, 1954 |
| 2,800,449 | Browning | July 23, 1957 |
| 2,831,022 | Van Blaricom et al. | Apr. 15, 1958 |